United States Patent
Meyer

[11] Patent Number: 5,819,856
[45] Date of Patent: Oct. 13, 1998

[54] LAWN EDGING TOOL

[76] Inventor: George Meyer, 20909 Shaws Creek Rd., Alton R1, Ontario, Canada, L0N 1A0

[21] Appl. No.: 861,632

[22] Filed: May 22, 1997

[51] Int. Cl.[6] .................................................. A01D 15/00
[52] U.S. Cl. ........................ 172/13; 172/371; 30/DIG. 5
[58] Field of Search ................................ 172/13, 14, 18, 172/19, 21, 22, 371, 372, 378, 380; 111/106, 107; 30/DIG. 5, 315; 16/110 R; 294/57, 58, 59, 60, 50.8

[56] References Cited

U.S. PATENT DOCUMENTS

| | | | |
|---|---|---|---|
| 1,537,537 | 5/1925 | Liebscher | 30/315 X |
| 1,931,349 | 10/1933 | Habig | 172/371 X |
| 2,057,142 | 10/1936 | Fry | 172/22 |
| 2,485,877 | 10/1949 | Hamilton | 30/315 |
| 2,513,730 | 7/1950 | Little, Sr. | 30/315 X |
| 2,814,875 | 12/1957 | Seals | 172/13 X |
| 3,156,304 | 11/1964 | Lawrence | 30/DIG. 5 X |
| 3,210,112 | 10/1965 | Glynn | 172/22 |
| 3,444,938 | 5/1969 | Ballmann | 172/22 X |
| 3,451,486 | 6/1969 | Vostoris | 172/13 |
| 3,830,310 | 8/1974 | Williams | 172/22 |
| 4,884,638 | 12/1989 | Hoffman | 172/22 |
| 4,974,682 | 12/1990 | Hoffman | 172/22 |

*Primary Examiner*—Terry Lee Melius
*Assistant Examiner*—Victor Batson

[57] ABSTRACT

A lawn edging tool comprises a first post which is hollow and having an open lower end to which a cutting blade is secured. A second post is fitted through the open lower end of and slideably held in the hollow first post The second post has a lower end provided with a ground plate below the first post. A spring is trapped between the upper end of the second post and a spring stop provided within the first post. This spring is compressed by pushing the first post downwardly over the second post with the ground plate in a ground engaging position to move the cutting blade on the first post downwardly from a storage to a cutting position. The spring, after being compressed, then provides a bias to raise the first post relative to the second post and to return the cutting blade to the storage position. Also provided on the lawn edging tool is a connector which holds the cutting blade against the lower end of the second post while allowing the blade to slide between the cutting and the storage positions The connector also prevents the second post from completely sliding out of the first post.

5 Claims, 3 Drawing Sheets

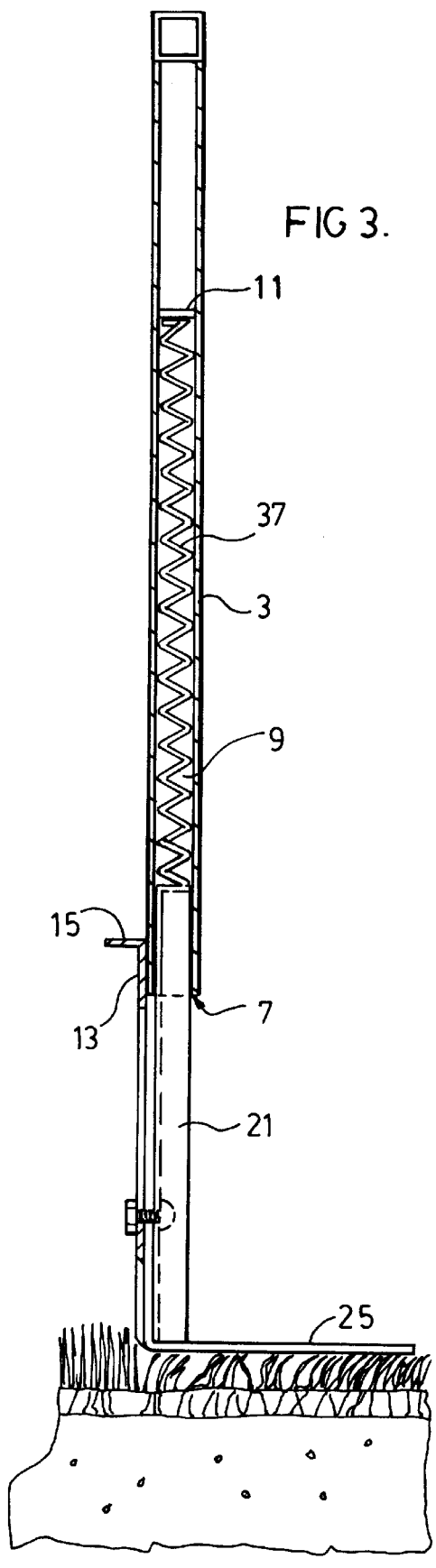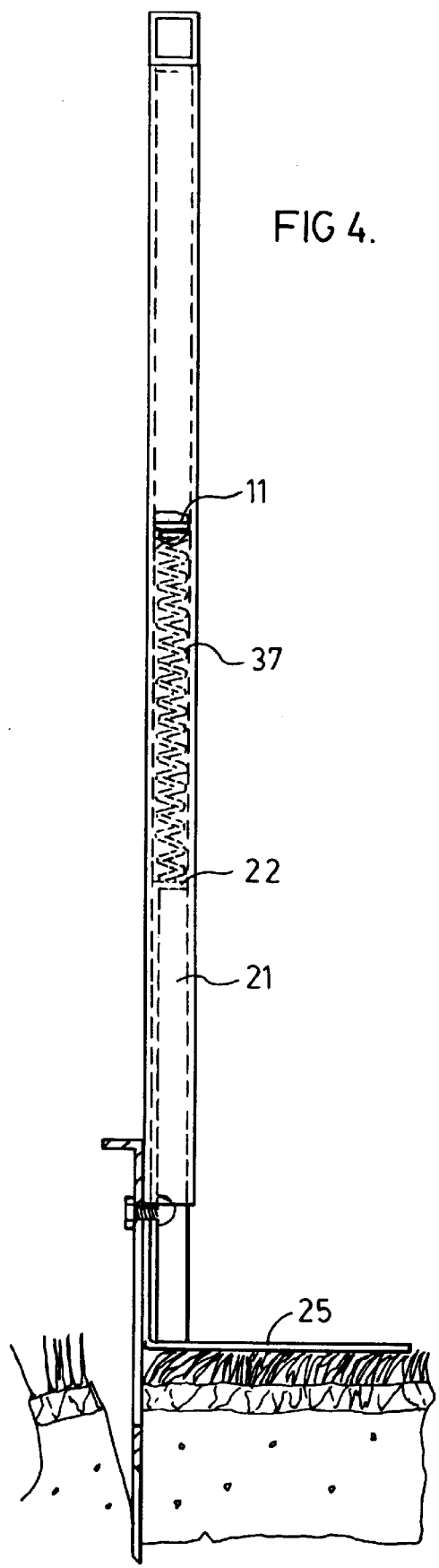

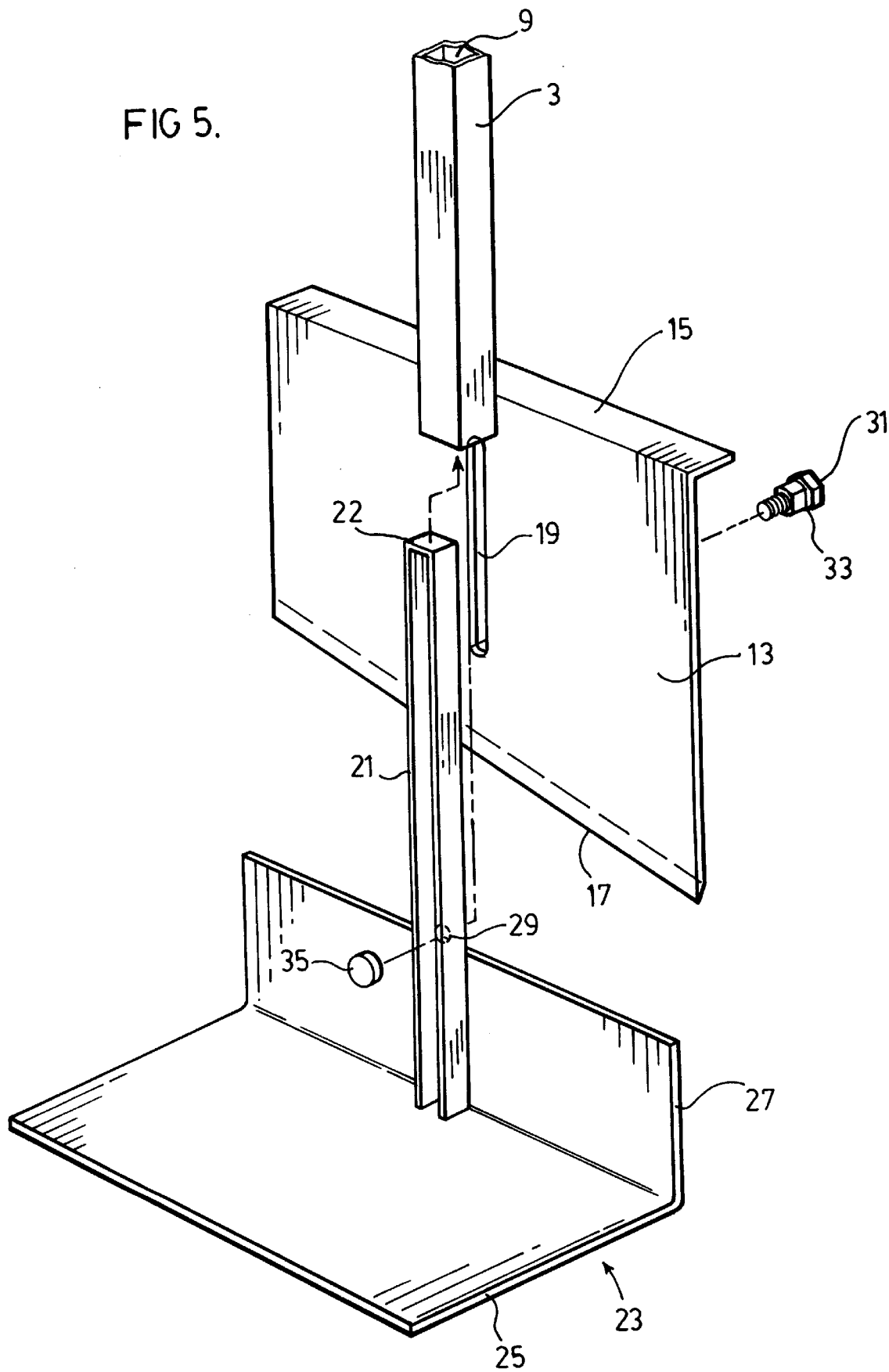

LAWN EDGING TOOL

FIELD OF THE INVENTION

The present invention relates to a spade-like lawn edging tool.

BACKGROUND OF THE INVENTION

A traditional lawn edging tool is in the form of a spade having a flat blade for a cutting edge. As anyone, who has done some gardening will appreciate, it is difficult with a traditional spade to place the blade in the same position from one cut to the next which is required in making a straight edge cut along a garden or lawn edge.

An improved lawn edge tool is shown in U.S. Pat. No. 3,451,486 issued Jun. 24, 1969 to J. Vostoris. The tool in the '486 patent comprises a relatively traditional spade which is slideably fitted to a bottom housing having a right angle plate. The base horizontal part of the plate is placed on the ground surface and the vertical part of the plate holds the spade in an upright position.

In the '486 patent, a spring is fitted around the outside of the post of the spade and this spring is compressed by pushing the spade downwardly in a cutting motion relative to the housing. The spring, when under compression, provides an assist for raising the spade back up for the next cutting motion.

One significant drawback with the tool construction in the '486 patent is that the spring is completely exposed and there is nothing to prevent the spring from buckling outwardly away from the spade post while the spring is being collapsed.

SUMMARY OF THE INVENTION

The present invention is in the form of a lawn edging tool comprising a first post having a lower end to which a cutting blade is secured. The first post has a hollow region interiorly thereof and the lower end of the post is open to that hollow region. A spring stop is provided in the hollow region spaced above the lower end of the first post.

Also provided is a second post having an upper portion slideably held in the hollow region of the first post and the second post has a lower end provided with a ground plate outside of the first post.

A spring is trapped between the second post and the spring stop in the first post and that spring is compressed by pushing the first post downwardly over the second post with the ground plate in a ground engaging position to move the blade downwardly from a storage to a cutting position. The spring, after being compressed, provides a bias to raise the first post relative to the second post and to return the cutting blade to the storage position while the ground plate remains in the ground engaging position.

Also provided is a connector which holds the cutting blade against the lower end of the second post while the blade is moved between the cutting and the storage positions. This connector also prevents the second post from completely sliding out of the first post.

In accordance with the present invention, the spring is contained completely within the first post so that it is not exposed to outside elements and further is trapped against outward buckling to ensure maximum efficiency of operation of the spring.

DESCRIPTION OF THE DRAWINGS

The above as well as other advantages and features of the present invention will be described in greater detail according to the preferred embodiments of the present invention in which;

FIGS. 3 and 4 are sectional views through the lawn edging tool of FIGS. 1 and 2 in a storage and a use position respectively;

FIG. 5 is an exploded perspective view of the lower end of the lawn edging tool of FIG. 2.

Figures 1, 2:
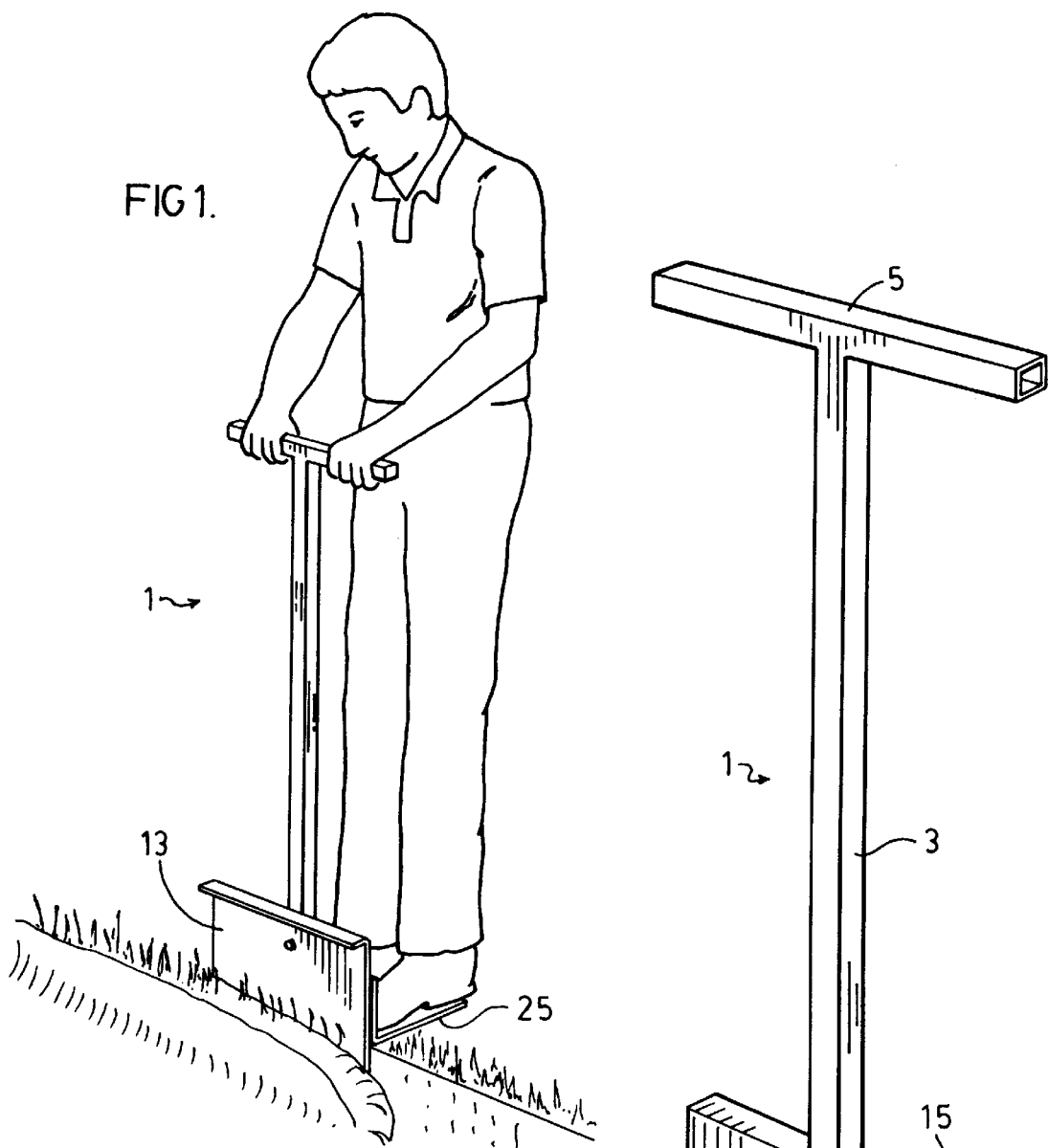
FIG. 1 is a perspective view showing a person operating a lawn edging tool having a construction in accordance with a preferred embodiment of the present invention.
FIG. 2 is a rear perspective view of the lawn edging tool of FIG. 1.

DETAILED DESCRIPTION ACCORDING TO THE PREFERRED EMBODIMENTS OF THE PRESENT INVENTION

FIG. 1 shows a person operating a lawn edging tool, generally indicated at 1. This lawn edging tool includes a main post 3 having an upper end handle 5 and a cutting blade 13 secured to the lower end of post 3. In the arrangement shown, cutting blade 13, which has a right angle step at its upper end is secured to one side of the lower end of post 3 by a weld or other suitable fastening means.

As will be seen in FIGS. 3, 4 and 5, post 3 has a hollow interior indicated at 9. The lower end of the post 7 is open exposing the hollow interior of the post.

Provided interiorly of post 3 and spaced well above the lower end of the post, is a spring stop 11.

Referring to FIG. 5, the tool includes a second post 21, the upper portion of which slides up into the hollow first post through its open lower end. Provided on the bottom of the second post, again by welding or the like, is a ground plate generally indicated at 23. This ground plate, which has a right angle construction comprising a horizontal base portion 25 and a vertical portion 27 is positioned below the lower end of the first post.

Cutting blade 13, which in the preferred embodiment, has a diagonal bottom cutting edge 17, is provided with an elongated closed ended slot 19. An opening 29 is provided in the second post and a mechanical fastener, e.g. bolt 31, is fitted through the slot 19 in the cutting blade and the aligned opening 29 in the second post. A nut 35 is then fitted onto the threads of bolt 31 which has square shoulders 33 that lock the bolt against rotation in the flat sided slot 19 to allow easy tightening of nut 35.

A spring 37 is trapped between the top 22 of post 21 and spring stop 11 inside the main post 3.

The tool is operated, as best shown in FIGS. 1, 3 and 4 by the operator pushing down on the main post while standing on the horizontal ground plate 25. This ensures, from one cut to the next, a constant vertical positioning of the main post and its lower end cutting blade. The main post can be pushed downwardly by using the handle 5, by pushing down with one foot on the upper edge 15 of the cutting blade while maintaining the other foot on the ground plate 25 or by a combination of both. The diagonal taper on the edge of the cutting blade makes the cutting action into the ground much easier than, for example, with a completely horizontal cutting edge.

As will be seen in comparing FIGS. 3 and 4, the cutting blade starts in a storage position with its lower edge level with ground plate 25 and with spring 37 in a relatively non-compressed state. In this position, the nut and bolt connector between the blade and the second post is at the bottom end of slot 19 preventing the second post from completely sliding out of the first post.

As shown in FIG. 4, the cutting blade is moved into the cutting position by pushing downwardly on post 3 which slides the main post downwardly along the second post and pushes the cutting blade well below the horizontal base plate 25. In the cutting position, spring 37 is compressed so that upon releasing of downward pressure on the main post, the spring biases the main post to slide upwardly along the secondary post returning the cutting blade to the storage position. This can also be accomplished by simply lifting the tool completely off the ground enabling the spring to push the second post down.

As will also be seen in comparing FIGS. 3 and 4, the connector between the blade and the second post maintains them in tight contact with one another while the blade is moved between the storage and the cutting positions. This ensures that the vertical portion 27 of the ground plate provides a guide for the movement of the cutting blade.

Although various preferred embodiments of the present invention have been described in detail, it will be appreciated by those skilled in the art, that variations may be made without departing from the spirit of the invention or the scope of the appended claims.

The embodiments of the invention in which an exclusive property or privilege is claimed are defined as follows:

1. A lawn edging tool comprising a first post having a lower end to which a cutting blade is secured, said first post having a hollow region interiorly thereof and said lower end of said first post being open to said hollow region, a spring stop in said hollow region spaced above said lower end of said first post, a second post having an upper portion slideably held in said hollow region of said first post and having a lower end provided with a ground plate outside of said first post, a spring trapped between said second post and said spring stop in said first post, said spring being compressed by pushing said first post downwardly over said second post with said ground plate in a ground engaging position to move said blade downwardly from a storage to a cutting position and said spring after being compressed providing a bias to raise said first post relative to said second post to return said cutting blade to the storage position with the ground plate remaining in the ground engaging position, and a connector which holds said blade against said lower end of said second post while said blade is moved between the cutting and the storage positions and which prevents said second post from completely sliding out of said first post.

2. A lawn edging tool as claimed in claim 1, wherein said ground plate comprises an upright portion, one side of which is a vertical guide for said blade, and a base portion at right angles to said upright portion.

3. A lawn edging tool as claimed in claim 1, wherein said cutting blade has a diagonal cutting edge.

4. A lawn edging tool as claimed in claim 1, wherein said cutting blade comprises a main vertical blade portion and a horizontally extending foot press portion atop said vertical blade portion.

5. A lawn edging tool as claimed in claim 1, wherein said connector comprises a mechanical fastener fitted through a hole in said second post and an elongated closed ended slot in said blade.

* * * * *